US008610774B2

(12) United States Patent
Onozawa

(10) Patent No.: US 8,610,774 B2
(45) Date of Patent: Dec. 17, 2013

(54) VIDEO PROCESSING APPARATUS FOR DISPLAYING VIDEO DATA ON DISPLAY UNIT AND CONTROL METHOD THEREFOR

(75) Inventor: Katsuyuki Onozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/875,017

(22) Filed: Sep. 2, 2010

(65) Prior Publication Data
US 2011/0058019 A1 Mar. 10, 2011

(30) Foreign Application Priority Data

Sep. 4, 2009 (JP) ................. 2009-204720

(51) Int. Cl.
H04N 7/18 (2006.01)
(52) U.S. Cl.
USPC ............... 348/143; 348/43; 348/46; 348/51; 348/42; 382/154; 382/285; 345/419; 345/418
(58) Field of Classification Search
USPC .......... 348/43, 46, 51, 42, 143; 382/154, 285; 345/419, 418
See application file for complete search history.

(56) References Cited

U.S. PATENT DOCUMENTS 7,720,308 B2 * 5/2010 Kitaura et al. ................. 382/285
8,131,064 B2 * 3/2012 Mashitani et al. ............ 382/154
8,199,147 B2 * 6/2012 Ishiyama et al. .............. 345/419
2004/0208357 A1 * 10/2004 Tokuhashi et al. ............ 382/154
2006/0126919 A1 * 6/2006 Kitaura et al. ................ 382/154

FOREIGN PATENT DOCUMENTS

| EP | 2106150 A2 | 9/2009 |
| JP | 10-040420 A | 2/1998 |
| JP | 11-164328 | 6/1999 |
| JP | 2003-018619 A | 1/2003 |
| JP | 2004-200739 A | 7/2004 |
| JP | 2006-268820 A | 10/2006 |
| JP | 2007-028439 A | 2/2007 |
| WO | 2008/139351 A1 | 11/2008 |
| WO | 2009/139740 A1 | 11/2009 |

* cited by examiner

Primary Examiner — Shawn An
(74) Attorney, Agent, or Firm — Canon USA Inc. IP Divison

(57) ABSTRACT

A video processing apparatus according to the present invention acquires a change rate per unit time of a parallax amount that is a shift amount in a direction of an interpupillary distance between a frame-image for left-eye and a frame-image for right-eye of one set. Then, the video processing apparatus determines, based on the change rate, a display parallax amount for displaying an object to be stereoscopically viewed by a user as approaching him at the change rate that is equal to or higher than a predetermined threshold. At that time, the display parallax amount is determined such that the object is stereoscopically viewed by the user as approaching him at a change rate smaller than the acquired change rate.

20 Claims, 14 Drawing Sheets

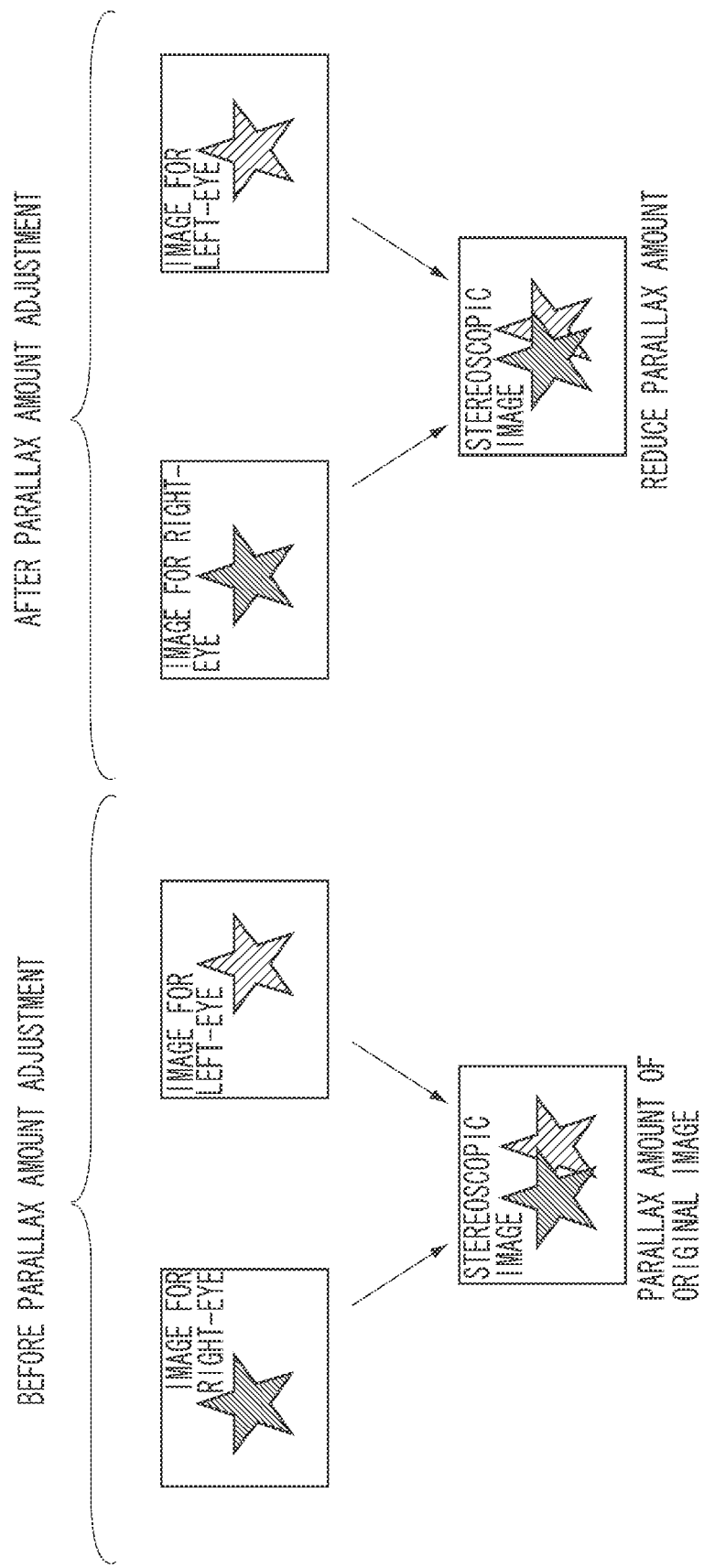

FIG. 9

| TIME-SEGMENT | T1 | T2 | T3 | T4 |
|---|---|---|---|---|
| PRE-ADJUSTMENT CHANGE RATE | 3 | 10 | 3 | 9 |
| DISPLAY CHANGE RATE | 3 | 5 | 3 | 4 |

THRESHOLD: 7

VIDEO PROCESSING APPARATUS FOR DISPLAYING VIDEO DATA ON DISPLAY UNIT AND CONTROL METHOD THEREFOR

BACKGROUND OF THE INVENTION

1. Field of the Invention

The present invention relates to a video processing apparatus that displays, on a display unit, video data including frame-image data for left-eye and frame-image data for right-eye such that a user can stereoscopically view an image represented by the video data, and to a control method therefor.

2. Description of the Related Art

Hitherto, a stereoscopic system has been known, which implements stereovision by displaying a three-dimensional (3D) image that utilizes a binocular parallax and that includes a image for left-eye and a image for right-eye. Such a stereoscopic system employs the following method. The method generates a parallax by shifting, in a direction of an interpupillary distance, the display positions of a frame-image for left-eye and a frame-image for right-eye represented by image data Consequently, the method implements stereoscopic effects of various objects included in an image represented by the video data. To prevent a user from having a discomfort feeling due to a large amount of projection of an object, it has been proposed to control the stereoscopic appearances of the object by adjusting a parallax amount that is a shift amount in the direction of the interpupillary distance between the images of the object within a set of a frame-image for left-eye and a frame-image for right-eye.

Japanese patent Application Publication No. 11-164328 discusses techniques in which when switching between 3D-images different in parallax amount or switching from a two-dimensional (2D) image to a 3D-image, an original 3D-image is displayed as a 2D-image and then returned to the original 3D-image so as to reduce a burden to eyes. When the parallax amount is put back to the original 3D-image, an acceptable threshold for the parallax amount is gradually increased with time.

The above techniques can suppress the stereoscopic effects of an object to be displayed when switching to a 3D-image. However, when returning to an original 3D-image after that, a moving speed in an anteroposterior direction (depth direction) of an object to be perceived is not considered. Depending on relationship between the moving speed of the object and the acceptable threshold, a user may perceive that the object is accelerated at a speed higher than an original moving speed and approaches him, and may be surprised.

SUMMARY OF THE INVENTION

The present invention is directed to a video processing apparatus that performs control to adjust a parallax amount of an image to prevent an object to be stereoscopically viewed, which is included in an image represented by image data, from being perceived to move towards a user at a speed equal to or higher than a predetermined value and to reduce a user's discomfort feeling. The present invention is also directed to a control method for such a video processing apparatus.

According to an aspect of the present invention, a video processing apparatus comprising a video processing apparatus for processing video data including sets of frame-image data, each set comprising left frame-image data for a user's left-eye and right frame-image data for the user's right-eye, so that a user can stereoscopically view an image represented by the video data, includes an acquisition unit configured to acquire, from video data of a predetermined time period, a change rate per unit time of a parallax amount that is a shift amount in a direction of an interpupillary distance between a frame-image for left-eye and a frame-image for right-eye of one set, a determination unit configured to determine whether the video data represents an image including an object to be stereoscopically viewed as approaching a user at the change rate equal to or higher than a predetermined threshold when the video data of the predetermined time period, from which the change rate is acquired, is displayed, a control unit configured to, when the determination unit determines that the acquired change rate is equal to or higher than the predetermined threshold, perform control to reduce the change rate per unit time of the parallax amount when the video data of the predetermined time is displayed, an adjustment unit configured to adjust video data representing an image that includes a frame-image for left-eye and a frame-image for right-eye, using the determined display parallax amount, and a processing unit configured to perform a process of displaying the adjusted video data on the display unit.

According to the present invention, an object to be stereoscopically viewed, which is included in an image represented by video data, can be prevented from being perceived as moving towards a user at a speed equal to or higher than a predetermined value. In addition, a user's discomfort feeling can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7B is a diagram conceptually illustrating a parallax amount adjustment method for adjusting a parallax amount by generating an image by individually moving a position of each object with respect to a frame-image frame.

FIG. 9 is a table illustrating a pre-adjustment parallax amount and a change rate of a display parallax amount in an original image at each time segment illustrated in FIG. 8.

DESCRIPTION OF THE EMBODIMENTS

Various exemplary embodiments, features, and aspects of the invention will be described in detail below with reference to the drawings.

Figure 1:
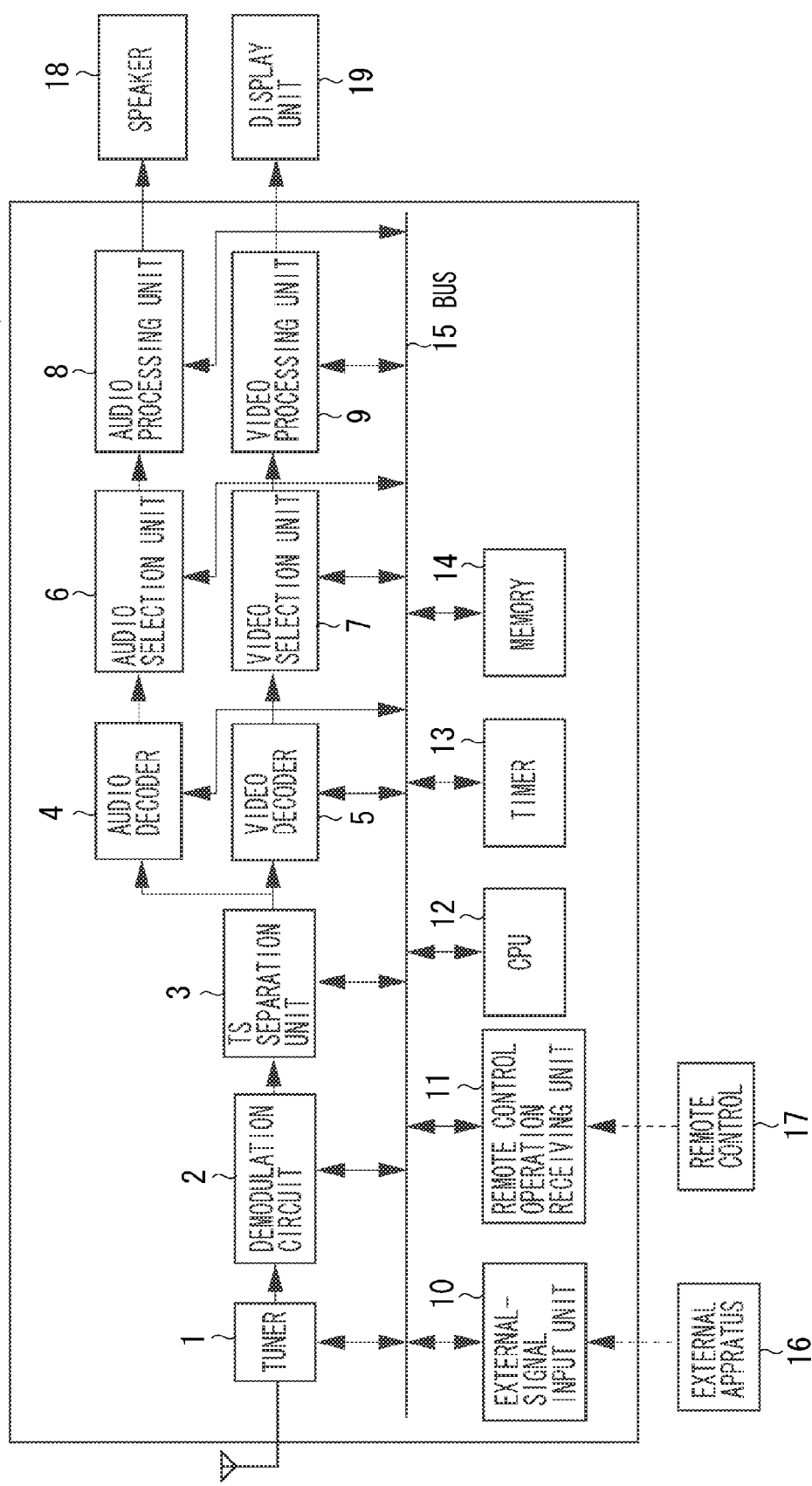
FIG. 1 is a diagram illustrating a stereoscopic system according to a first exemplary embodiment of the present invention.
Figure 2:
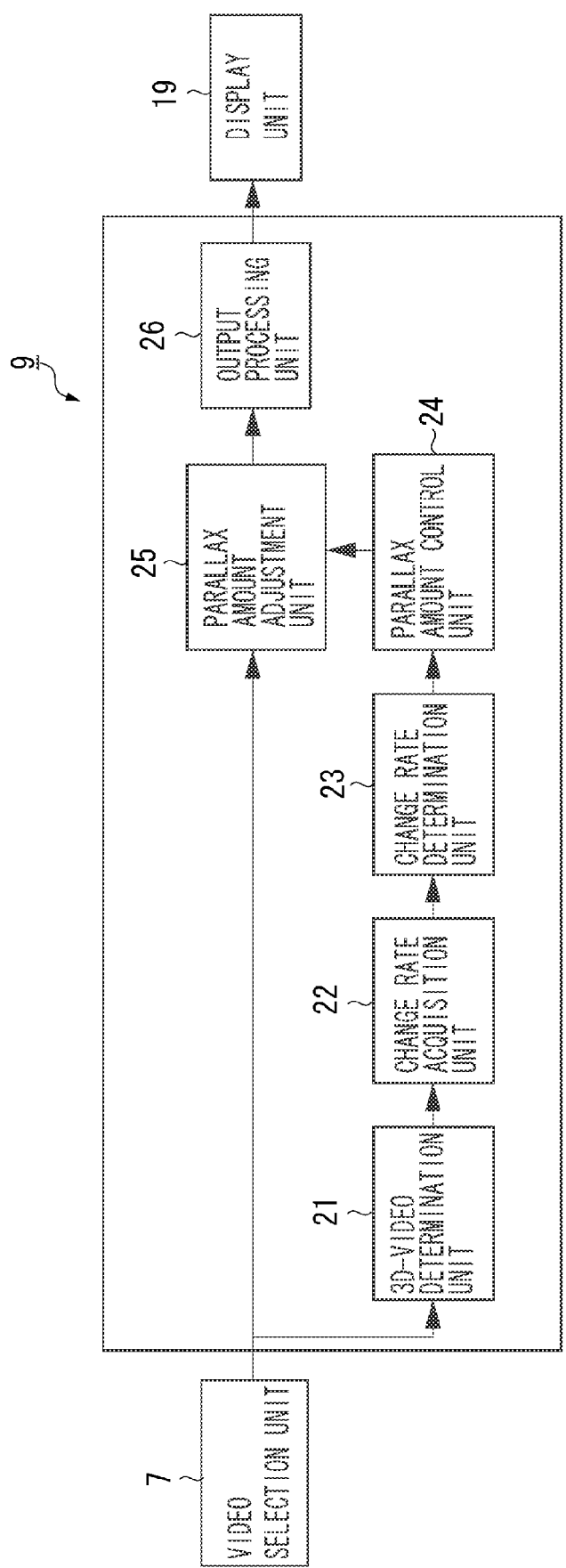
FIG. 2 is a diagram illustrating a configuration of a video processing unit.

Hereinafter, a first exemplary embodiment of the present invention is described with reference to the drawings. FIGS. 1 and 2 illustrate an example of a configuration of a system implementing the present invention.

In a processing apparatus 100 illustrated in FIG. 1, a tuner 1, a video decoder 5, a video selection unit 7, a video processing unit 9, a central processing unit (CPU) 12, a memory 14 and the like are connected via a bus 15.

The tuner 1 selects a frequency component including a signal of a broadcast channel designated by the CPU 12 that receives instructions from, e.g., a remote control operation receiving unit 11 for receiving a signal representing an operation performed on a remote control 17. The tuner 1 transmits the selected frequency component to a demodulation circuit 2. The demodulation circuit 2 performs digital demodulation on the frequency component transmitted from the tuner 1. In addition, the demodulation circuit 2 performs error correction, descramble processing, and the like. Then, the demodulation circuit 2 supplies obtained transport stream (TS) signals to a TS separation unit 3.

The TS separation unit 3 separates and extracts an audio signal and a video signal, which correspond to the designated broadcast channel, and additional data from the TS signal extracted by the demodulation circuit 2. Then, the TS separation unit 3 supplies the audio signal and the video signal to an audio decoder 4 and the video decoder 5, respectively.

The audio decoder 4 decodes the audio signal received from the TS separation unit 3. The video decoder 5 decodes the image signal received from the TS separation unit 3. The decoded audio signal and the decoded video signal are transmitted to an audio selection unit 6 and the video selection unit 7, respectively.

An external-signal input unit 10 is an input interface that receives audio and video signals (AV signals) input from an external apparatus 16. The audio signal input via the external-signal input unit 10 is transmitted to the audio selection unit 6, while the video signal input via the external-signal input unit 10 is transmitted to the video selection unit 7. The audio selection unit 6 and the video selection unit 7 select, according to control instructions from the CPU 12, a set of an audio signal and a video signal of a channel selected by the tuner 1, or a set of an audio signal and a video signal input from the external-signal input unit 10. Each of the audio processing unit 8 and the video processing unit 9 performs various signal processing on the audio signal and the video signal respectively selected by the audio selection unit 6 and the video selection unit 7.

The CPU 12 collectively controls the entire processing apparatus 100. A timer 13 measures a time-period in which video processing is performed by the video processing unit 9 that is described below, and the like. The memory 14 stores metadata, programs, and data temporarily stored in each process to be described below. A speaker 18 and a display unit 19 output audio data and image data based on an audio signal and a video signal output from the audio processing unit 8 and the video processing unit 9, respectively.

FIG. 2 illustrates in detail the video processing unit 9 illustrated in FIG. 1. A 3D-image determination unit 21 determines whether a 3D-image or a 2D-image is selected by the video selection unit 7 illustrated in FIG. 1. The determination can be performed according to known techniques concerning identification of 3D-images, using metadata attached to an image, which indicates whether the image is a 3D-image or a 2D-image, or determining, based on analysis of correlativity between frame-images, whether a left-eye image and a right-eye image are present.

If the image is a 3D-image, a change rate acquisition unit 22 acquires a change rate of a pre-adjustment parallax amount, which is a parallax amount of an original 3D-image. The term "parallax amount" means a shift amount in a direction of an interpupillary distance between the positions of an object, which respectively correspond to a set of a frame-image for left-eye and a frame-image for right-eye. The change rate of the parallax amount acquired by the change gate acquisition unit 22 is a rate of a parallax amount per unit time obtained when the parallax amount is changed in response to a change in the images, i.e., frame-images to be displayed.

The parallax amount in a set comprising a frame-image for left-eye and a frame-image for right-eye corresponds to a difference in the position of the same object included in each frame-image. For example, when a ball is present in each frame-image as an object to be displayed, a difference between the horizontal coordinate value of the central point of the ball in the frame-image for right-eye and that of the central point of the ball in the frame-image for left-eye is a parallax amount. A change amount of a parallax amount is a difference (Y2−Y1) between the parallax amount Y1 of the ball in the frame-image set at a time t1 and the amount Y2 of the ball in the frame-image set at a time t2. A change rate is a value obtained by dividing the change amount by a time (t2−t1).

A change rate determination unit 23 determines whether the acquired change rate is equal or higher than a predetermined threshold. A change rate of a parallax amount corresponds to, e.g., a moving speed in a depth direction of an image of an object to be stereoscopically viewed and perceived by a user. The change rate thereof is compared with the threshold. Accordingly, the change rate determination unit 23 determines whether a user perceives that an object included in an image to be stereoscopically viewed moves at a speed equal to or higher than a predetermined speed. A parallax amount control unit 24 determines, based on a region's change rate being equal to or higher than the predetermined threshold, a parallax amount to be used when an image is displayed, as a display parallax amount. Then, in order to display an image with the determined display parallax amount, the parallax amount control unit 24 generates a control signal for adjusting a parallax amount of an image. The parallax amount control unit 24 causes a memory or the like to temporarily store the control signal. Then, the parallax amount control unit 24 outputs the control signal to a parallax amount adjustment unit 25. In addition, the parallax amount control unit 24 detects whether an image whose parallax amount is to be next adjusted is input.

The parallax amount adjustment unit 25 performs, based on the control signal output from the parallax amount control unit 24, adjustment processing of a parallax amount of an input 3D-image. When the input image is a 2D-image, the adjustment processing is not performed. A video signal output from the parallax amount adjustment unit 25 is input to an output processing unit 26. The output processing unit 26 performs video processing for displaying the video signal.

Figure 7A:
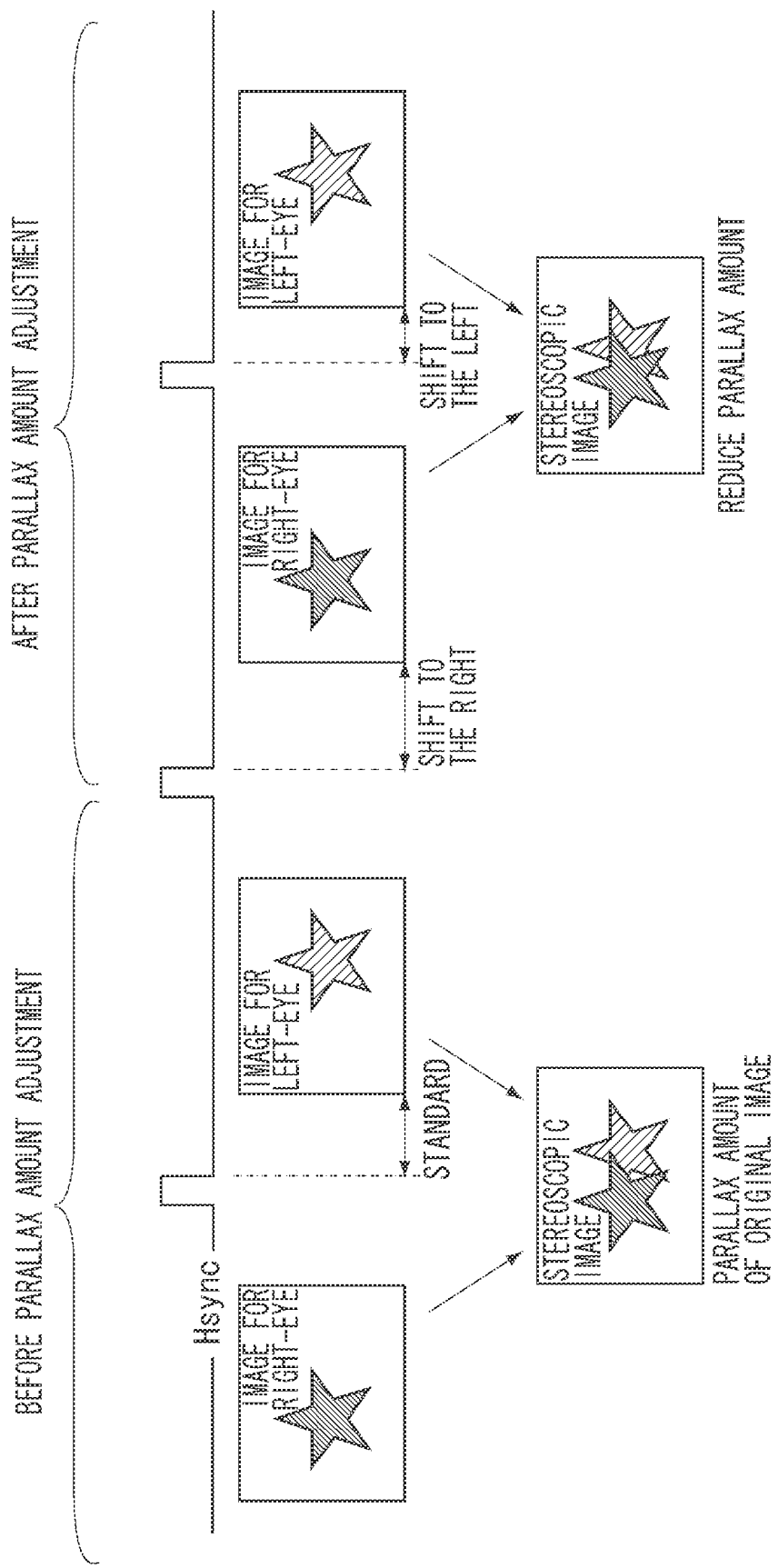
FIG. 7A is a diagram conceptually illustrating a parallax amount adjustment method for adjusting display positions of a frame-image for left-eye and a frame-image for right-eye by shifting the positions in a direction of an interpupillary distance.

Hereinafter, a specific control procedure to be performed by the above composing units according to the present embodiment is described. As illustrated in FIGS. 7A and 7B, there are two major types of parallax amount adjustment methods, i.e., a method (see FIG. 7A) for adjusting a parallax amount by shifting display positions of a frame-image for left-eye and a frame-image for right-eye in the direction of an interpupillary distance. Another method (see FIG. 7B) is adjusting a parallax amount by generating images in which the position of each object with respect to a frame-image frame is individually moved. Hereinafter, a process performed according to the method illustrated in FIG. 7A is described.

Figure 3:
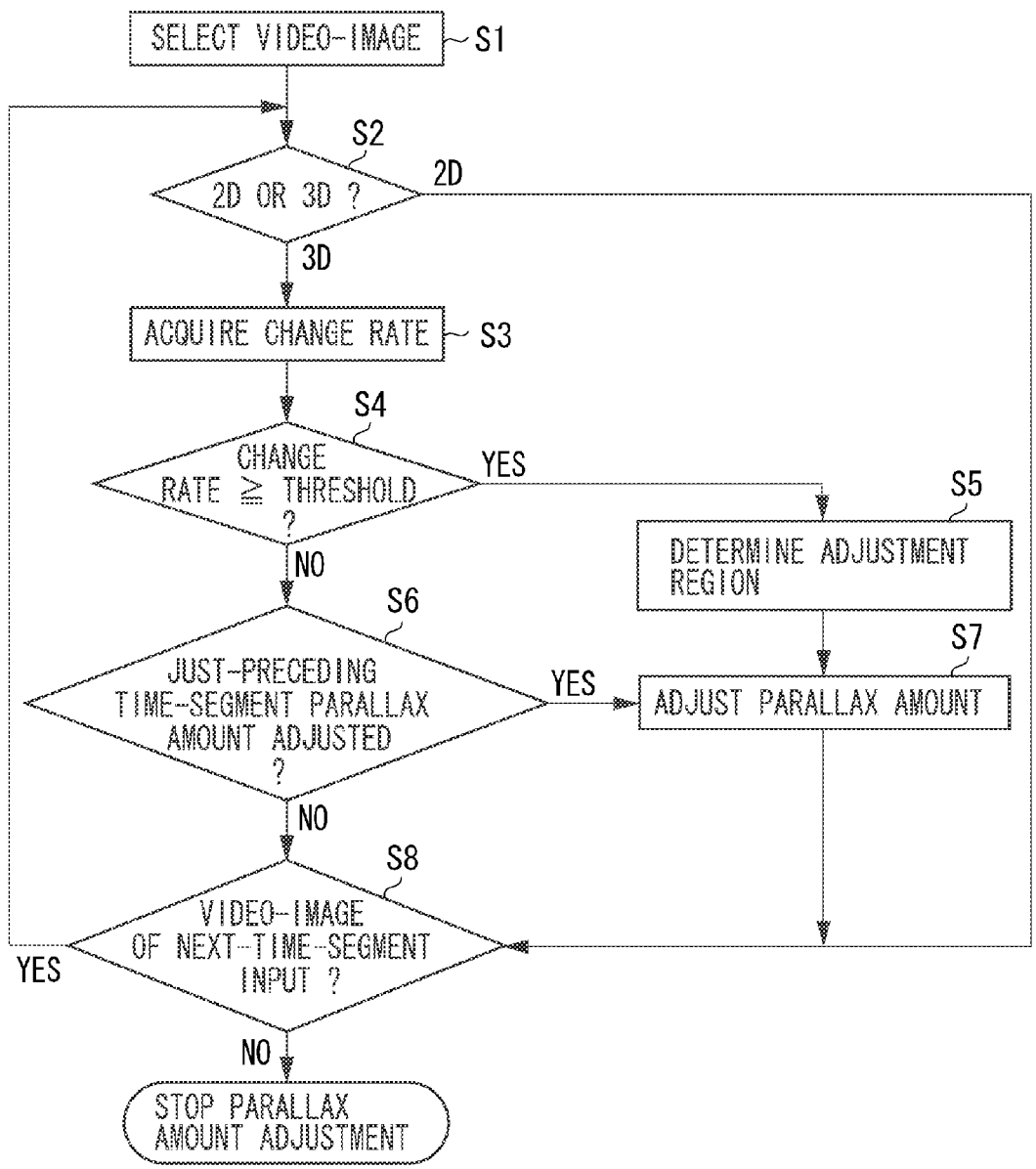
FIG. 3 is flowchart illustrating a parallax amount adjustment according to the first exemplary embodiment of the present invention.

FIG. 3 shows an example of a flowchart illustrating a flow of the process according to the present embodiment. In the process described hereinafter, a time-period is divided into time-segments each having a predetermined length. The processing is performed corresponding to each time-segment. The predetermined length can be set to correspond to a set of a frame-image for left-eye and a frame-image for right-eye, or to a plurality of sets of frame-images for left-eye and frame-images for right-eye.

First, in step S1, the image selection unit 7 selects, based on a signal from the external-signal input unit 10 or the remote control operation receiving unit 11, an image to be output to the display unit 19. In step S2, the 3D-image determination unit 21 determines whether a 2D-image or a 3D-image is processed in the present time-segment. If the image is determined to be a 2D-image, processing concerning a change rate of a parallax amount, which is described below, is not performed. The process proceeds to video processing corresponding to the next time-segment.

If the image to be processed in the present time-segment is determined by the 3D-image determination unit 21 to be a 3D-image (YES in step S2), in step S3, the change rate acquisition unit 22 acquires change rates of the pre-adjustment parallax amount in the time-segment, which respectively correspond to all regions in each frame-image. For example, a positive value is allotted to the change rate of a region including an object that is perceived, by a user, as approaching the user. On the other hand, a negative value is allotted to the change rate of a region including an object that is perceived, by a user, as leaving (or moving away from) the user. Thus, perceived directions of movement of an object in the image are distinguished. The present embodiment does not perform recognition and identification of an object itself included in an image represented by video data. Accordingly, the processing is performed on the assumption that an object perceived as approaching by the user is included in the region in which the change rate has a positive value.

Figure 4:
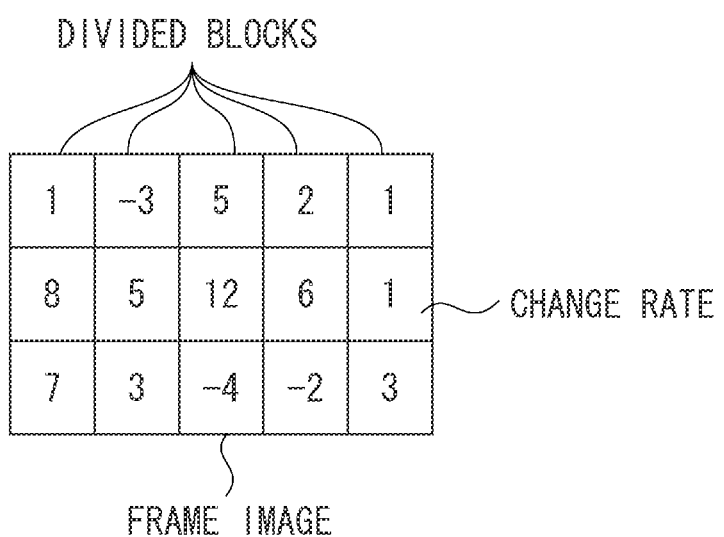
FIG. 4 is a diagram illustrating an acquisition region having blocks obtained by dividing a frame-image, from each of which a change rate of a parallax amount is acquired.

According to the present embodiment each frame image is divided into a predetermined number of block regions. The change rate of parallax amount may be acquired for each region. Hereinafter, the case of dividing each frame-image into 3×5(=15) block-regions, as illustrated in FIG. 4, is described. However, a division number is not limited to the above number. Each frame-image can be divided into, e.g., 10×10(=100) block-regions. The regions set to acquire the change rate of a parallax amount are not limited thereto. The change rate acquisition unit 22 acquires a change rate of a pre-adjustment parallax amount corresponding to each block-region in an image within every time-segment.

Next, in step S4, the change rate determination unit 23 determines whether there is a region in which the change rate is equal to or higher than the predetermined threshold, among block regions which include an object perceived as approaching by a user and has a positive change rate acquired by the change rate acquisition unit 22. If there is a region having a change rate equal to or higher than the predetermined threshold (YES in step S4), the region can be considered to include some object perceived as approaching a user at a high speed equal to or higher than the predetermined value. However, the present invention prevents an object, perceived by a user as approaching him, from being perceived as moving at a speed equal to or higher than the predetermined value. Accordingly, the change rate of the block-region that may include an object perceived by a user as approaching him is controlled to decrease. If such a region is present (YES in step S4), in step S5, the parallax amount control unit 24 determines each attention (adjustment) region to which attention is paid, for use in adjusting a parallax amount. It is sufficient for the attention region to have a change rate equal to or higher than the threshold. However, preferably, the attention region is set to be a region having the largest change rate, among regions of each frame-image.

The parallax amount control unit 24 stores information representing whether adjustment is performed on a final frame-image, information representing a position of an attention region in each frame-image, and information representing a display parallax amount as adjustment information regarding the adjustment of the final frame-image in a time-segment just before the present time-segment in which the processing is currently performed. If there is no region having a change rate equal to or higher than the predetermined threshold (NO in step S4), in step S6, the parallax amount control unit 24 determines, based on the adjustment information stored by the parallax amount control unit 24, whether the adjustment of the parallax amount is performed on the final frame-image in a time-segment just before the present time-segment in which the processing is currently performed.

If it is determined that there is a region having a change rate equal to or higher than the predetermined threshold (YES in step S4), or if it is determined that the adjustment of the parallax amount is performed on the final frame-image in a time-segment just before the present time-segment in which the processing is currently performed (YES in step S6), the parallax amount control unit 24 determines a display parallax amount to be used when a frame-image is displayed.

Figure 5:
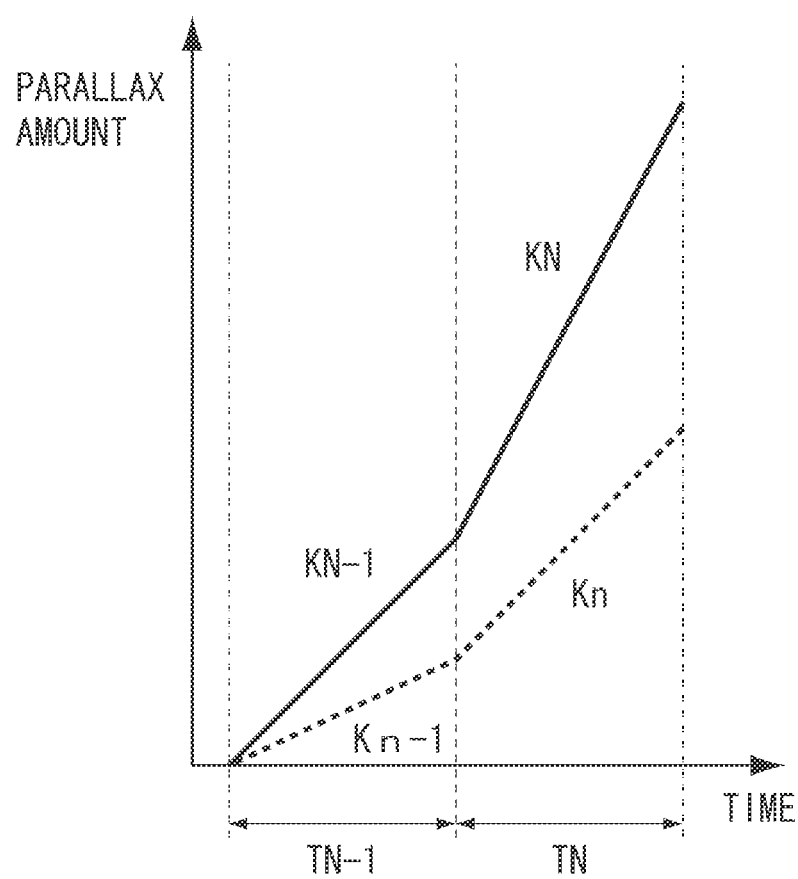
FIG. 5 is a graph conceptually illustrating an example of a method for determining a display parallax amount.

A method for determining a display parallax amount corresponding to a time-segment TN is described hereinafter with reference to FIG. 5. The axis of ordinates of FIG. 5 represents the parallax amount corresponding to the attention region determined in step S5 (illustrated in FIG. 3). A user is assumed to perceive that when the parallax amount increases in a positive direction with time, any object included in video data moves in a direction in which the object approaches him from a display screen. A solid line represents change in the pre-adjustment parallax amount. A dashed line represents change in the display parallax amount.

The relationship among a change rate KN of the pre-adjustment parallax amount corresponding to a time-segment TN, a change rate KN−1 of the pre-adjustment parallax amount corresponding to a time-segment TN−1, and a threshold Kth for the change rate is here assumed to be Kth<KN−1<KN. First, in the time-segment TN−1, the change rate KN−1 of the pre-adjustment parallax amount is equal to or higher than the threshold Kth. Thus, a display parallax amount is determined such that the parallax amount changes at a change rate Kn−1 smaller than the change rate KN−1. At that time, in order to determine the change rate Kn−1, calculation, Kn−1=α×KN−1, is carried out by multiplying the change rate KN−1 by a predetermined coefficient α (e.g., 0.8) which is smaller than 1. If the change rate KN−1 largely (greatly) exceeds the threshold Kth, preferably, the change rate Kn−1 is determined by reducing the value of the multiplier coefficient α (so the value of α is preferably reduced as the difference between KN−1 and Kth increases).

The change rate Kn of the display parallax amount corresponding to the time-segment TN is assumed to be smaller than the pre-adjustment parallax amount KN, similarly to the change rate Kn−1. In addition, the change rate Kn is preferably determined such that the relationship between the change rate Kn−1 of the display parallax amount corresponding to the time-segment TN−1 and the change rate Kn of the display parallax amount corresponding to the time-segment TN is similar to the magnitude relationship between the change rate KN−1 of the pre-adjustment parallax amount corresponding to the time-segment TN−1 and the change rate KN of the pre-adjustment parallax amount corresponding to the time-segment TN. If KN−1<KN, the change rate Kn is determined by multiplying the change rate KN by a coefficient equivalent to α which multiplies the change rate KN−1 when the change rate Kn−1 is determined, or by a coefficient set such that the relationship between the changes rates Kn−1 and Kn can be Kn−1<Kn. At that time, in order to prevent an object perceived by a user as approaching him from being perceived as moving at a speed equal to or higher than the predetermined value, the change rate Kn is prevented from becoming extremely (much) larger than the threshold Kth.

In order to prevent the parallax amount from unnaturally changing between successive time-segments, a display parallax amount corresponding to the present time-segment in which the parallax amount is currently adjusted is determined by considering a pre-adjustment parallax amount and a display parallax amount, which correspond to the immediately preceding time-segment or to the immediately preceding frame-image. For example, if the parallax amount corresponding to some region of an image before the parallax amount is adjusted continuously changes over time-segments, the parallax amount is adjusted to prevent the parallax amount from being discontinuous in an image after the parallax amount is adjusted. Thus, the display parallax amount corresponding to the time-segment, in which the parallax amount is adjusted, is determined by considering adjustment information corresponding to the time-segment just precedent thereto. The parallax amount control unit 24 generates a control signal for displaying an image with the determined display parallax amount.

In step S7, the parallax amount adjustment unit 25 adjusts the parallax amount corresponding to an image in the present time-segment, based on the generated control signal. At that time, a known method such as a method for adjusting a horizontal synchronization timing in a signal representing each image can be employed as a method for adjusting the display positions of the frame-image for left-eye and the frame-image for right-eye such that the parallax amount corresponding to the attention region is equal to the display parallax amount determined by the parallax amount control unit 24. If there is no region in which the change rate is equal to or higher than a predetermined threshold, and the parallax amount is not adjusted in the last frame-image in the immediately preceding time-segment (NO in step S6), the parallax amount adjustment unit 25 finishes a control operation in the present time-segment. Then, in step S8, the image selection unit 7 determines whether there is an image input in the next time-segment. If there is an image input in the next time-segment (YES in step S8), the process starting from step S2 is performed in the next time-segment. Otherwise (NO in step S8), the parallax amount adjustment is stopped.

The change rate of the parallax amount can be acquired from the parallax amount corresponding to each region, which is obtained by image analysis or the like. If the change rate of the parallax amount is added to the image as metadata, the change rate of the parallax amount can be acquired from the metadata. Alternatively, the change rate of the parallax amount can be acquired by the following method. First, block-regions are extracted from each of the frame-image for left-eye and the frame-image for right-eye, using a block-matching method or the like. Then, a parallax amount corresponding to each of the regions is acquired according to positional relationship between associated points. Next, based on the parallax amount, the change rate of the parallax amount in the time-segment is acquired. In addition, either an average change rate in a time-segment or that in a plurality of time-segments can be acquired as the change rate. The threshold for the parallax amount can preliminarily be determined. Alternatively, the apparatus 100 can be configured so that the threshold is set by a user. In addition, the threshold can be varied according to types of contents, a user's age, or the like.

Figure 6:
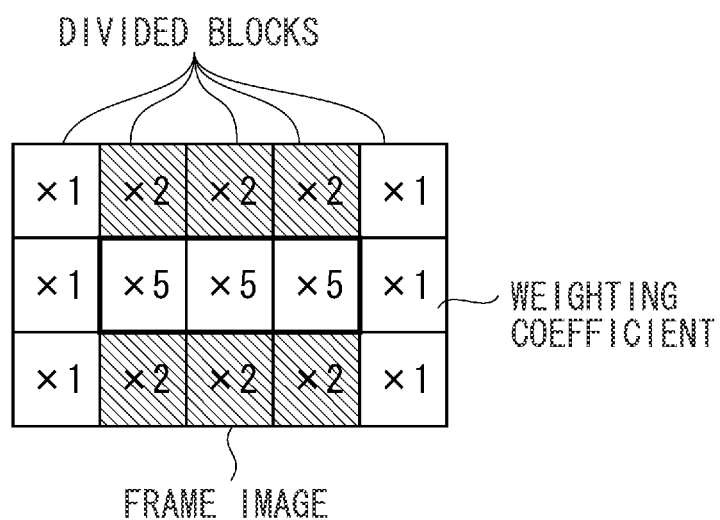
FIG. 6 is a diagram conceptually illustrating weighting performed when an attention region is determined.

Weighting of change rates can be performed according to the positions of the regions respectively having the change rates in each frame-image including regions each having a change rate equal to or higher than the threshold. It is considered that when the region having a change rate equal to or higher than the threshold is located at a central portion of the screen, a user is more surprised than when the region having such a change rate is located at an end of the screen. Accordingly, an attention region can be determined by performing the weighting of the change rates, i.e., multiplying each of the acquired change rates by a coefficient varying (e.g., from 1 to 5) with the position of the region corresponding thereto in each frame-image, as illustrated in FIG. 6. If a frame-image includes a plurality of regions each having a change rate equal to or higher than the threshold, a region having a largest value obtained by multiplying an associated change value of the parallax amount by a weighting coefficient can be, for example, determined as an attention region. The parallax amount corresponding to each frame-image in the time-segment can be adjusted, based on the change rate of the pre-adjustment parallax amount in the attention region determined in the above manner.

Figure 8:
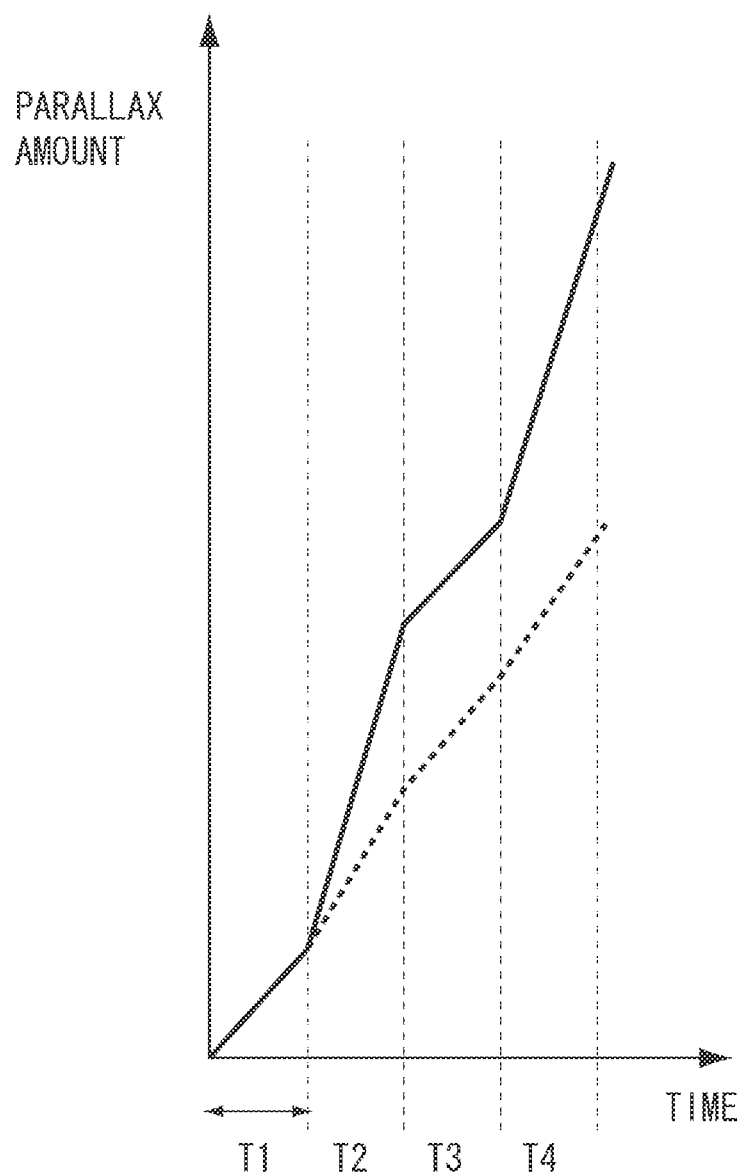
FIG. 8 is a graph illustrating a parallax amount adjustment according to the first exemplary embodiment of the present invention.

FIG. 8 illustrates the relationship between the parallax amount acquired by performing a control operation illustrated by the flowchart shown in FIG. 3 and time. The axis of ordinates of FIG. 8 represents the parallax amount corresponding to the attention region determined in step S5 illustrated in FIG. 3. A user is assumed to perceive that when the parallax amount increases in a positive direction with time, any object included in video data moves in a direction in which the object approaches him from a display screen. The solid line represents change in the pre-adjustment parallax amount. The dashed line represents change in the display parallax amount according to the present embodiment. FIG. 9 illustrates a table showing a pre-adjustment change rate that is the change rate of a pre-adjustment parallax amount corresponding to each time-segment, and a display change rate that is the change rate of a parallax amount corresponding to each time-segment.

According to the present embodiment, a single time-segment is assumed to be 0.5 seconds. The parallax amount is adjusted using an average change rate of the parallax amount corresponding to each time-segment in the attention region.

First, in time-segment T1, the change rate of the pre-adjustment parallax amount is smaller than a threshold of 7. Thus, no adjustment is performed. Consequently, the parallax amount remains a parallax amount of an original image. In time-segment T2, the change rate of the pre-adjustment parallax amount is equal to or larger than the threshold. Thus, the parallax amount of each frame-image is determined such that the change rate thereof is less than the change rate of the pre-adjustment parallax amount. Consequently, in time-segments T1 and T2, the parallax amount is determined, in consideration of the change rate of the pre-adjustment parallax amount, to change linearly or non-linearly and continuously with the parallax amount in time-segment T1.

In time-segment T3, the change rate of the pre-adjustment parallax amount is smaller than the threshold. However, because the parallax amount is (has been) adjusted in time-segment T2 (that is the preceding time-segment), the parallax amount is adjusted to change linearly or non-linearly and continuously with the parallax amount in time-segment T2. Although the change rate of the display parallax amount in time-segment T3 is set to remain the change rate of the pre-adjustment parallax amount, as illustrated in FIG. 9, the change rate of the display parallax amount in time-segment T3 can be changed to a smaller change rate, in view of the change rate in the preceding time-segment T2 or the subsequent time-segment.

In addition, in time-segment T4, the change rate of the pre-adjustment parallax amount is equal to or higher than the threshold. The parallax amount is adjusted also in time-segment T3 that is the preceding time-segment. Accordingly, the parallax amount is adjusted to change linearly or non-linearly and continuously with the display parallax amount in time-segment T3.

According to the present invention, the orientation (direction) of movement of an object to be stereoscopically viewed in an image in the depth direction thereof can be changed from the orientation of movement of the object in an original image. More specifically, although the parallax amount is changed to increase in the original image, the parallax amount is changed to be reduced, so that the gradient of the change rate of the parallax amount is changed. Accordingly, e.g., an object perceived as projecting towards a user from the display screen can be changed so that the object is perceived as moving into the back. However, when the parallax amount is adjusted by changing, as indicated by a dashed line illustrated in FIG. 8, the pre-adjustment parallax amount of the original image in addition to the change of the gradient, an object perceived by a user as moving towards him from the display screen in the original image can be shown in an adjusted image with a reduced moving speed without changing the orientation of movement thereof.

Thus, the parallax amount corresponding to each region having a change rate equal to or higher than the predetermined threshold is determined to be smaller than the change rate of the pre-adjustment parallax amount. Consequently, the present invention can reduce a discomfort feeling caused by an object that is included in video data and perceived by a user as moving towards him at a speed equal to or higher than a predetermined value. In addition, a control operation can be implemented, without impairing movement of an object which is to be stereoscopically viewed in an original image, by reducing the change rate of the parallax amount while the gradient of the change rate thereof is maintained.

After the above adjustment of the parallax amount is performed, a restoration time-period TR, in which the parallax amount is restored, can be provided. Thus, the parallax amount can be adjusted to return to an original parallax amount. The parallax amount control unit 24 detects a difference $\Delta P$ between the pre-adjustment parallax amount in each frame-image just preceding the restoration time-period TR and the display parallax amount. Then, the parallax amount control unit 24 controls an operation to determine the display parallax amount on an image in the restoration time-period TR such that the difference $\Delta P$ between the pre-adjustment parallax amount and the display parallax amount decreases with time. At that time, the change rate of the display parallax amount can be adjusted so as not to be equal to or higher than the predetermined threshold.

Figure 10A:
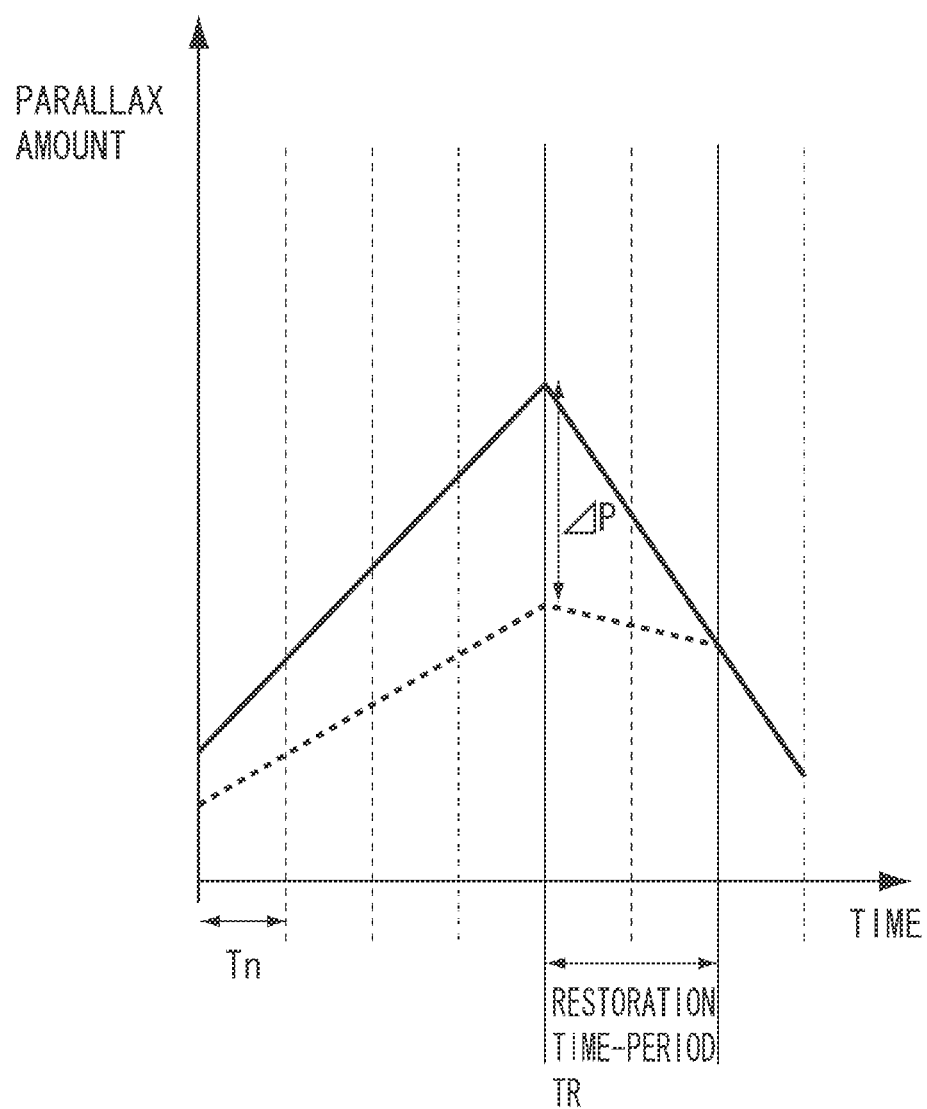
FIG. 10A is a first graph conceptually illustrating parallax amount adjustment in a restoration time-period according to the first exemplary embodiment of the present invention.
Figure 10B:
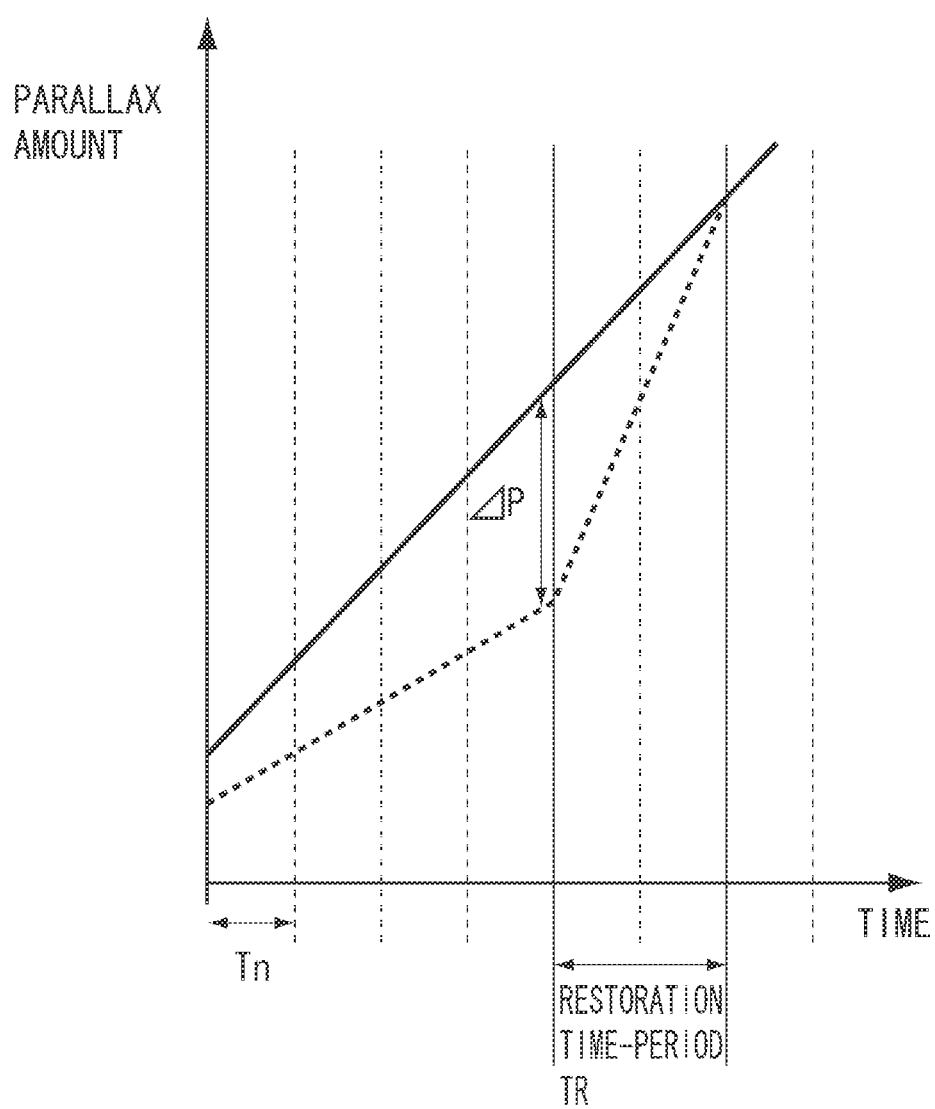
FIG. 10B is a second graph conceptually illustrating the parallax amount adjustment in the restoration time-period according to the first exemplary embodiment of the present invention.

If the difference $\Delta P$ is large, when the pre-adjustment parallax amount is quickly restored, an object in the image is perceived as moving largely (significantly) in a direction in which the object approaches a user. Thus, the user is surprised at the object. In order to make the change rate of the display parallax amount smaller than that of the pre-adjustment parallax amount, the restoration time-period TR can be set to be variable with the magnitude of the difference $\Delta P$. Particularly, a method for restoring the parallax amount can be adapted to restore the parallax amount so that the pre-adjustment parallax amount in the attention region decreases and that an object present in the attention region moves away from a user (see FIG. 10A). Alternatively, the method can be adapted so that the parallax amount is restored after a predetermined time has elapsed since the adjustment of the parallax amount is started (see FIG. 10B).

When also in the restoration time-period TR, the display parallax amount is adjusted to restrain the change rate of the display parallax amount from becoming equal to or higher than the change rate of the pre-adjustment parallax amount, the present embodiment can reduce a discomfort feeling due to movement of an object in the image, which is stereoscopically viewed, towards a user at a speed equal to or higher than a predetermined value.

A method for generating images such that the positions of objects included in the video data are individually moved with respect a frame-image frame according to a second exemplary embodiment of the present invention (see FIG. 7B) is described hereinafter as a method for adjusting the parallax amount.

A flow of a process according to the present embodiment is described hereinafter with reference to a flowchart illustrated in FIG. 3, similarly to the description of the first exemplary embodiment of the present invention. The definition of the time-segment, and processing in steps S1 and S2 according to the present embodiment of the present invention are similar to those described in the description of the first exemplary embodiment of the present invention. Thus, the descriptions of the time-segment and steps S1 and S2 are omitted below.

In step S3, the change rate acquisition unit 22 acquires a change rate of a parallax amount corresponding to each object in each frame-image, which is perceived by a user as moving from an image display screen in a direction in which each object approaches him. Thus, the change rates of the number of the objects are acquired. The object is, e.g., a ball described in the description of the first exemplary embodiment. The first exemplary embodiment does not perform a process of specifying an object included in video data, different from the second exemplary embodiment. Hereinafter, a configuration according to the present embodiment, which specifies a physical body using an optional recognition technique and processes the specified body as the object, is described. It is supposed that a method for adjusting a parallax amount in units of an object is applied to a process of analyzing 2D-image data, recognizing an object included in 2D-image data, and generating 3D-image data based on perspectives of the object and the background thereof.

Next, in step S4, the change rate determination unit 23 determines whether there is an object moving with a change rate equal to or higher than a predetermined threshold, among objects perceived by a user as approaching him in the image. In step S5, this object is set to be an adjustment object. According to the present embodiment, a plurality of adjustment objects can be present. In that case, the adjustment is performed on each adjustment object.

Figure 11:
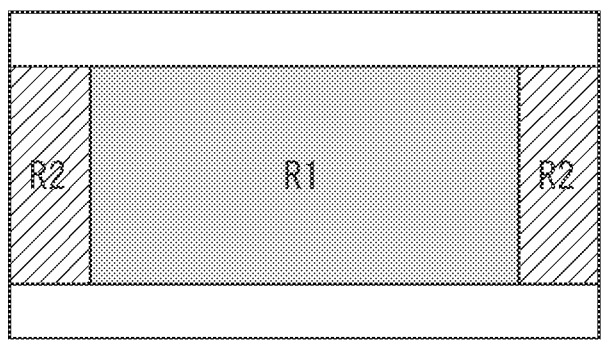
FIG. 11 is a diagram conceptually illustrating weighting to be performed when a display parallax amount is determined, according to a second exemplary embodiment of the present invention.

The parallax amount control unit 24 determines, as a display parallax amount, a parallax amount when an image of the adjustment object is displayed, based on the change rate of some adjustment object which is equal to or higher than the predetermined threshold. At that time, weighting may be performed by a user according to the position and the size of the object having a parallax amount equal to or higher than a threshold, as illustrated in FIG. 11, to determine a display parallax amount corresponding to the adjustment object. It is considered that when a large-size object having a change rate equal to or higher than the threshold is present at a central region R1 of the screen, a user is more surprised than when a small-size object having such a change rate is present at an end region R2 of the screen. Thus, the display parallax amount can be determined by restraining movement of the latter object much more than that of the former object.

The parallax amount control unit 24 stores, together with information representing whether the adjustment is performed, information representing the position of each adjustment object in each frame-image, and the display parallax amount, and the like as adjustment information. If there is no object having a change rate equal to or higher than the predetermined threshold (NO in step S4), in step S6, the parallax amount control unit 24 determines, based on the stored adjustment information, whether an adjustment object adjusting the parallax amount is present in the last frame-image in a time-segment immediately preceding the present time-segment in which the parallax amount is adjusted.

If the change rate determination unit 23 determines that there is no object having the change rate equal to or higher than the predetermined threshold (NO in step S4), or (but) if the parallax amount control unit 24 determines that there is an adjustment object adjusting the parallax amount in the last frame-image in the time-segment immediately preceding the present time-segment (YES in step S6), the parallax amount control unit 24 generates a control signal. In step S7, the parallax amount adjustment unit 25 adjusts the parallax amount corresponding to each adjustment object in an image in the present time-segment.

If there is no region having a change rate equal to or higher than the predetermined threshold, and there is no object adjusting the parallax amount in the last frame-image (NO in step S4 and NO in step S6), then in step S8, a control operation in the present time-segment is ended. In addition, the image selection unit 7 determines whether there is an image input in the next time-segment. If there is an image input in the next time-segment (YES in step S8), the image selection unit 7 performs the process starting from step S2 in the next time-segment. If there is no image input in the next time-segment (NO in step S8), the image selection unit 7 stops the parallax amount adjustment.

Thus, the parallax amount corresponding to the object having a change rate equal to or higher than the predetermined threshold is determined so that the change rate is smaller than the change rate of the pre-adjustment parallax amount. Consequently, the present embodiment can reduce a discomfort feeling generated by causing a user to perceive that the object moves towards him at a speed equal to or higher than a predetermined value. An object having little action in the image can be displayed without changing a sense of distance in a depth-direction when a user views the object. In addition, the change rate is reduced while the gradient of the change rate of the parallax amount is maintained. Accordingly, a control can be performed without impairing movement of the object to be stereoscopically viewed in an original image.

Hereinafter, a third exemplary embodiment of the present invention is described. The present embodiment performs a control operation when an attention region, to which attention is paid to adjust a parallax amount, is changed, during adjustment of a parallax amount, by the movement of an object in each frame-image and a fade-out of the object. Similarly to the first exemplary embodiment, an object about which the change rate of the parallax amount is acquired, is each block-region into which each frame-image is divided, as illustrated in FIG. 4. A method illustrated in FIG. 7A is employed as a parallax amount adjustment method.

Figure 12:
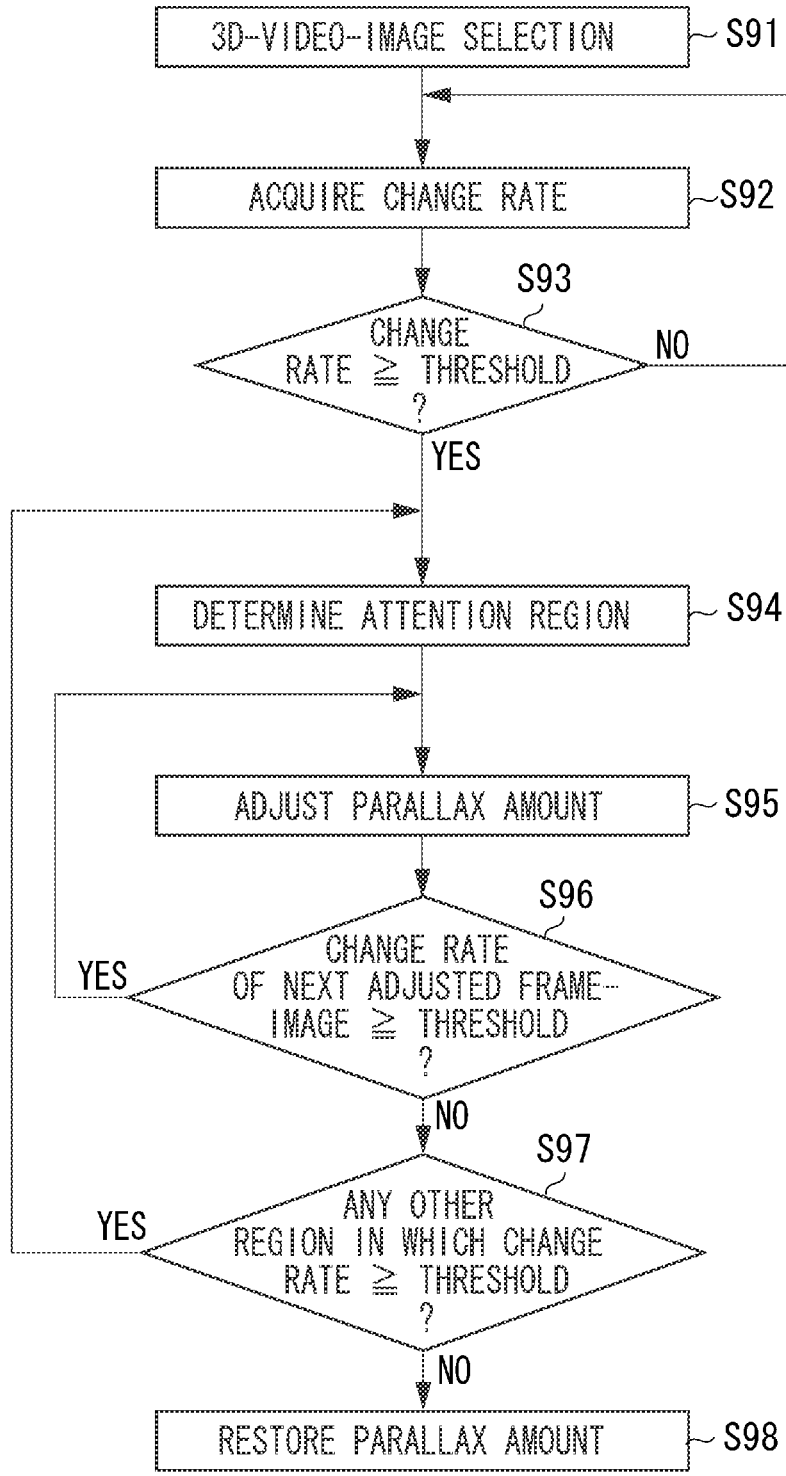
FIG. 12 is a flowchart illustrating a parallax amount adjustment process according to a third exemplary embodiment of the present invention.

FIG. 12 illustrates an example of a flowchart illustrating a flow of a process for implementing the present invention. When the image selection unit 7 selects a 3D-image in step S91, in step S92, the change rate acquisition unit 22 acquires a change rate of a parallax amount. Next, in step S93, the change rate determination unit 23 determines whether the acquired change rate is equal to or higher than a threshold. Then, if the acquired change rate is equal to or higher than the threshold (YES in step S93), in step S94, the parallax amount control unit 24 determines an attention (adjustment) region, to which attention is paid, from regions each having a change rate equal to or higher than the threshold. The determined attention region is used to adjust a parallax amount. Then, in step S95, the parallax amount adjustment unit 25 adjusts the parallax amount based on the control signal generated by the parallax amount control unit 24 according to the change rate acquired in step S92.

In step S96, the change rate determination unit 23 determines whether the change rate of the attention region determined in step S94 is equal to or higher than the threshold even in each frame-image in which the parallax amount is next adjusted "frame-image". If the change rate is equal to or higher than the threshold (YES in step S96), in step S95, the parallax amount is adjusted based on the change rate of the attention region determined in step S94. If the change rate of the attention region used in step S94 to adjust the parallax amount is neither equal to nor higher than the threshold (NO in step S96), in step S97, the change rate determination unit 23 determines whether, among other regions in each frame-image, there is a region of the change rate equal to or higher than the threshold. If, among other regions, there is a region of the change rate equal to or higher than the threshold (YES in step S97), in step S94, the parallax amount control unit 24 sets the region as a new attention region and generates a control signal for adjusting the parallax amount. Then, in step S95, the parallax amount adjustment unit 25 adjusts the parallax amount. At that time, the parallax amount is determined in consideration of the change rate of the pre-adjustment parallax amount so as to change linearly or non-linearly and continuously in successive images between which the attention region is changed.

If, in other regions, there is no region corresponding to the change rate equal to or higher than the threshold (NO in step S97), in step S98, a restoration time-period TR is provided, in which the display parallax amount is restored to the pre-adjustment parallax amount similarly to the first exemplary embodiment. During and after the restoration of the parallax amount, the change rate of the parallax amount is acquired. If there is again a region in which the change rate is equal to or higher than the threshold, the present embodiment performs a control operation in step S94 or later.

Thus, even when the attention region is changed during the parallax amount adjustment, the change rate of the parallax amount in an image of a region to be stereoscopically viewed can be determined to be smaller than that of the pre-adjustment parallax amount. In addition, the parallax amount corresponding to the region having a change rate equal to or higher than the predetermined threshold is set such that its change rate becomes smaller than the change rate of the pre-adjustment parallax amount. Accordingly, the present embodiment can reduce a discomfort feeling caused to a user who perceives that an object moves towards him at a speed equal to or higher than the predetermined value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-204720 filed Sep. 4, 2009, which is hereby incorporated by reference herein in its entirety.

What is claimed is:

1. An image processing apparatus for displaying stereoscopically, an image based on an image data including an image frame for left-eye and an image frame for right-eye to a display unit, comprising:
   a description unit configured to discriminate whether an inter-frame difference, which is a difference between two frames, of a parallax amount of the image frame for left-eye and the image frame for right-eye is equal to or more than a predetermined value; and
   a control unit configured to perform adjustment of parallax amount of an image frame for left-eye and an image frame for right-eye that should be displayed on the display unit,
   wherein the control unit performs adjustment to make a parallax amount of an image frame for left-eye and an image frame for right-eye smaller in the predetermined frame in a case where the inter-frame difference related to a predetermined frame is discriminated by the discrimination unit so as to be equal to or more than the predetermined value, and
   wherein the control unit performs adjustment of the parallax amount in the predetermined frame based on a parallax amount adjusted in a frame before the predetermined frame in a case where the inter-frame difference related to the predetermined frame is discriminated by the discrimination unit so as not to be equal to or more than the predetermined value and a parallax amount of an image for left-eye and an image for right-eye of the frame before the predetermined frame was adjusted.

2. The image processing apparatus according to claim 1, further comprising:
   a recognition unit configured to recognize a specific object, among objects included in an image represented by the image data to be stereoscopically viewed, by acquiring metadata attached to the image data, or analyzing the image data,
   wherein the discrimination unit discriminates an inter-frame difference of a parallax amount corresponding to the specific object recognized by the recognition unit, and
   wherein the control unit performs control to determine, when the discriminated inter-frame difference of the specific object is equal to or more than the predetermined value, a display parallax amount to be used when the specific object is displayed, using at least one of a size of the specific object, a position of the specific object in an image represented by the image data, and a direction of movement of the specific object.

3. The image processing apparatus according to claim 1, wherein the control unit performs control to discriminate a difference between the parallax amount adjusted by the control unit and a pre-adjustment parallax amount, and determine a display parallax amount which is a parallax amount used for displaying the image based on the image data so that the difference between the parallax amount adjusted by the control unit and the pre-adjusted parallax amount gradually decreases with time.

4. The image processing apparatus according to claim 1, wherein the control unit, in a case where the inter-frame difference is discriminated by the discrimination unit to be more than or equal to the predetermined value, controls to determine a display parallax amount which is a parallax amount used for displaying the image based on the image data so that the image based on the image data with inter-frame difference that is smaller than the inter-frame difference discriminated by the discrimination unit is displayed on the display unit.

5. The image processing apparatus according to claim 1, wherein the discrimination unit discriminates inter-frame differences of block-regions into which the image frame for left-eye and the image frame for right-eye is divided by a predetermined number, and
   wherein the control unit performs control to determine, as an attention region, the block-region indicating the inter-frame difference equal to or more than the predetermined value and further determine the display parallax amount from an inter-frame difference of the attention region.

6. The image processing apparatus according to claim 5 wherein a region having the largest inter-frame difference, among the block-regions of each of the image frame for left-eye and the image frame for right-eye, is determined as the attention region.

7. The image processing apparatus according to claim 5, wherein the attention region is determined based on the position in each of the image frame for left-eye and the image frame for right-eye.

8. The image processing apparatus according to claim 5 wherein a central region in each of the image frame for left-eye and the image frame for right-eye is determined with high priority as the attention region.

9. The image processing apparatus according to claim 5, wherein the control unit determines a block-region which the difference of a parallax amount of an image frame for left-eye and an image frame for right-eye is equal to or more than the predetermined value between the predetermined frame and a frame after the predetermined frame from block-regions besides the block-region, as the attention region, in a case where the difference of the parallax amount of the image frame for left-eye and the image frame for right-eye between the predetermined frame and the frame after the predetermined frameis discriminated by the discrimination unit so as not to be equal to or more than the predetermined value.

10. The image processing apparatus according to claim 5, wherein the attention region is determined from among the block-regions indicating the inter-frame differences equal to or more than the predetermined value, by weighting of the inter-frame differences according to positions of the block-regions within the image frame for left-eye and the image frame for right-eye, and the display parallax amount is determined from the inter-frame difference of the attention region.

11. The image processing apparatus according to claim 1, wherein the control unit adjusts the parallax amount in the predetermined frame so that the parallax amount in the predetermined frame is changed linearly or non-linearly and continuously with the parallax amount adjusted in the frame before the predetermined frame, in a case where the inter-frame difference related to the predetermined frame is discriminated by the discrimination so as not to be equal to or more than the predetermined value and also in a case where the parallax amount of the image for left-eye and the image for right-eye in the frame before the predetermined frame is adjusted.

12. A method for displaying stereoscopically, an image based on an image data including an image frame for left-eye and an image frame for right-eye to a display unit, comprising:
discriminating whether an inter-frame difference, which is a difference between two frames of a parallax amount of the image frame for left-eye and the image frame for right-eye is equal to or more than a predetermined value; and
performing adjustment of parallax amount of an image frame for left-eye and an image frame for right-eye that should be displayed on the display unit,
wherein adjustment is made to make a parallax amount of an image frame for left-eye and an image frame for right-eye smaller in the predetermined frame in a case where the inter-frame difference related to a predetermined frame is discriminated so as to be equal to or more than the predetermined value, and
wherein adjustment is made of the parallax amount in the predetermined frame based on a parallax amount adjusted in a frame before the predetermined frame in a case where the inter-frame difference related to the predetermined frame is discriminated so as not to be equal to or more than the predetermined value and a parallax amount of an image for left-eye and an image for right-eye of the frame before the predetermined frame was adjusted.

13. A method for controlling an image processing apparatus for displaying stereoscopically, an image based on an image data including an image frame for left-eye and an image frame for right-eye to a display unit, comprising:
discriminating whether an inter-frame difference, which is a difference between two frames, of a parallax amount of the image frame for left-eye and the image frame for right-eye is equal to or more than a predetermined value;
performing adjustment of parallax amount of an image frame for left-eye and an image frame for right-eye that should be displayed on the display unit,
wherein adjustment is performed to make a parallax amount of an image frame for left-eye and an image frame for right-eye smaller in the predetermined frame in a case where the inter-frame difference related to a predetermined frame is discriminated by the discrimination unit so as to be equal to or more than the predetermined value, and
wherein adjustment is performed of the parallax amount in the predetermined frame based on a parallax amount adjusted in a frame before the predetermined frame in a case where the inter-frame difference related to the predetermined frame is discriminated so as not to be equal to or more than the predetermined value and a parallax amount of an image for left-eye and an image for right-eye of the frame before the predetermined frame was adjusted; and
recognizing a specific object, among objects included in an image represented by the image data to be stereoscopically viewed, by acquiring metadata attached to the image data, or analyzing the image data,
wherein an inter-frame difference of a parallax amount corresponding to the specific object recognized is discriminated, and
wherein it is determined, when the discriminated inter-frame difference of the specific object is equal to or more than the predetermined value, a display parallax amount to be used when the specific object is displayed, using at least one of a size of the specific object, a position of the specific object in an image represented by the image data, and a direction of movement of the specific object.

14. The method according to claim 13, wherein it is determined in the discriminating step, a difference between the parallax amount adjusted by the control unit and a pre-adjustment parallax amount and, a display parallax amount which is a parallax amount used for displaying the image based on the image data so that the difference between the parallax amount adjusted by the control unit and the pre-adjustment parallax amount gradually decreases with time.

15. The method according to claim 13, wherein in a case where the inter-frame difference is discriminated to be more than or equal to the predetermined value, controls to determine a display parallax amount which is a parallax amount used for displaying the image based on the image data so that the image based on the image data with inter-frame difference that is smaller than the inter-frame difference discriminated, is displayed.

16. The method according to claim 13, wherein in the discrimination step, inter-frame differences of block-regions into which the image frame for left-eye and the image frame for right-eye is divided by a predetermined number is discriminated, and
wherein it is determined, as an attention region, the block-region indicating the inter-frame difference equal to or more than the predetermined value and it is further determined the display parallax amount from an inter-frame difference of the attention region.

17. The method according to claim 16, wherein the attention region is determined from among the block-regions indicating the inter-frame differences equal to or more than the predetermined value, by weighting of the inter-frame differences according to positions of the block-regions within the image frame for left-eye and the image frame for right-eye, and the display parallax amount is determined from the inter-frame difference of the attention region.

18. The method according to claim 16 wherein a region having the largest inter-frame difference among the block-regions of each of the image frame for left-eye and the image frame for right-eye, is determined as the attention region.

19. The image processing apparatus according to claim 16, wherein the attention region is determined based on the position in each of the image frame for left-eye and the image frame for right-eye.

20. The image processing apparatus according to claim 16 wherein a central region in each of the image frame for left-eye and the image frame for right-eye is determined with high priority as the attention region.

* * * * *